United States Patent [19]

Bräunling et al.

[11] Patent Number: 5,004,560
[45] Date of Patent: Apr. 2, 1991

[54] BASIC POLYPYRRYLENEMETHINES AND SALTS THEREOF, AND A PROCESS FOR THEIR PREPARATION

[75] Inventors: Hermann Bräunling, Burghausen; Richard Becker, Emmerting, both of Fed. Rep. of Germany

[73] Assignee: Wacker-Chemie GmbH, Munich, Fed. Rep. of Germany

[21] Appl. No.: 169,474

[22] Filed: Mar. 17, 1988

[30] Foreign Application Priority Data

Mar. 31, 1987 [DE] Fed. Rep. of Germany ....... 3710657

[51] Int. Cl.$^5$ .......................... C08F 26/06; H01B 1/06
[52] U.S. Cl. .................................... 526/258; 252/500; 252/518; 252/512; 252/519; 252/520; 528/423; 204/59 R; 526/259; 526/90; 526/137; 526/173; 526/213; 526/214
[58] Field of Search ....................... 252/500, 512, 518; 526/258, 259, 89, 90, 135, 137, 140, 173, 213, 214; 204/59 R; 528/422, 423; 524/439, 401

[56] References Cited

U.S. PATENT DOCUMENTS 3,086,001   4/1963   Wildi .................................. 260/125

FOREIGN PATENT DOCUMENTS 3531600   3/1987   Fed. Rep. of Germany .

Primary Examiner—Josephine Barr
Attorney, Agent, or Firm—Collard, Roe & Galgano

[57] ABSTRACT

Basic polypyrrylenemethines, and salts thereof, having conjugated double bonds and constructed from optionally substituted five-membered heterocyclic rings containing nitrogen, as the only hetero atom in the ring are disclosed, with the five-membered rings, in each case, being bonded to one another in pairs via an optionally substituted carbon atom as a bridging member. The polymer compositions of the invention contain at least five of these five-membered rings and 0 to 50%, relative to the weight of these polymers, of dopants and/or being electrochemically doped. A process for the preparation of the claimed compositions is further disclosed. The polymer compositions of the invention have electroconducting and semi-conducting properties and are useful, for example, in batteries, circuits and switches, if appropriately used in conjunction with other polymers. In addition, the compounds of the invention can also be employed as absorbents for heavy metals and as catalysts.

20 Claims, 3 Drawing Sheets

BASIC POLYPYRRYLENEMETHINES AND SALTS THEREOF, AND A PROCESS FOR THEIR PREPARATION

The present invention relates to polypyrrylenemethines, and salts thereof, which are obtainable through quaternization of at least one of the basic pyrrole nitrogen atoms, and a process for the preparation of such polymers.

The compounds of the invention have electroconducting and semi-conducting properties and can be employed, for example, in batteries, circuits and switches, if appropriately mixed with other polymers. Additionally, the compounds of the invention can also be employed as absorbents for heavy metals and as catalysts.

Poly(hetero)arylenemethines are disclosed in DE-A 35-31 600 (laid open on Mar. 5, 1987, H. Bräunling et al, Wacker-Chemie GmbH). The synthesis described therein is based on the reaction of (hetero)aromatics with compounds of the formula X—CH$_2$—R''—CX$_2$—R, in which R can denote, for example, a hydrogen atom, X can denote, for example, a halogen atom, X$_2$ can denote two halogen atoms or a carbonyl oxygen atom, and R'' can denote a (hetero)arylidene radical. Polypyrrylenemethines, in particular, are not expressly mentioned therein.

It is, therefore, an object of the invention to provide novel polymers having conjugated double bonds.

A further object of the present invention is to develop a novel process for the preparation of polymers having conjugated double bonds.

The foregoing and related objects are achieved by the present invention wherein polymers, which have conjugated double bonds and are constructed from optionally ring-substituted five-membered heterocyclic rings, were in each case, prepared having one optionally substituted nitrogen atom as the only hetero atom in the ring. The five-membered rings are, in each case, bonded to one another in pairs via an optionally substituted carbon atom as the bridging member. The polymers of the invention contain at least five of these five-membered rings and 0 to 50%, relative to the weight of these polymers, of dopants, and/or are electrochemically doped.

The polymers, according to the invention, are preferably those which contain units of the formula (I)

wherein
A represents substituents which are identical or different radicals of the formula (II)

in which, in the above formulae (I) and (II),
X, Y and Z selected independently of one another, denote identical or different univalent radicals, i.e., a hydrogen atom, an alkyl group with 1 to 18 carbon atoms or a phenyl radical, which may optionally be substituted by a halogen atom, a nitro-group, an alkyl group of 1 to 4 carbon atoms or an aryl; and Y and Z, which, as can be seen from formula (II), are in each case bonded to the carbon atoms of the heterocyclic ring and which are not substituted by groups of the formula C-X, can, in addition to the aforesaid definitions, also represent the substituent—COOR, in which R represents a hydrogen atom, a phenyl group or an alkyl group having 1 to 18 carbon atoms;

M represents hydrogen, a metal atom, a metal ion, a metal complex, a Lewis acid, an alkyl group having 1 to 18 carbon atoms or a phenyl radical;

n represents the integer 0 or 1, with the proviso that when n denotes 0, the appropriate unit of the formula (I) is uncharged, and when n denotes 1, this unit has a positive charge,
and the dashed circle within the five-membered ring in the formula (II) represents two bonding $\pi$ electron pairs in the heterocyclic ring.

Examples of X, Y and Z radicals are hydrogen atoms; alkyl radicals, such as methyl, ethyl, n-propyl, iso-propyl, n-, sec-and t-butyl radicals, n-, sec-, t- and neo-pentyl radicals, hexyl radicals, such as the n-hexyl radical, heptyl radicals, octyl radicals, such as the n-octyl and 2,2,4-trimethylpentyl radical, nonyl radicals, such as the n-nonyl radical, decyl radicals, such as the n-decyl radical, undecyl, dodecyl, tridecyl, tetradecyl, pentadecyl, hexadecyl, heptadecyl and octadecyl radicals; phenyl radicals; substituted phenyl radicals, such as o-, m- and p-toluene radicals, xylene radicals, biphenylyl radicals, o-, m-and p-chlorophenyl radicals, nitrophenyl radicals and other similar radicals.

Further examples of Y and Z substituents are radicals of the formula—COOR, examples of R substituents being hydrogen atoms, phenyl radicals and the radicals mentioned as examples of X, Y and Z alkyl radicals.

Examples of M substituents are the hydrogen atom, phenyl radicals, the C$_1$ to C$_{18}$-alkyl radicals mentioned as examples of X, Y and Z radicals, Lewis acids, such as BF$_3$, AlCl$_3$, SnCl$_4$, BBr$_3$ BF$_3$-diethyl etherate, FeCl$_3$ and ZnCl$_2$, iron, metal cations of the transition elements and complexes of metals and metal cations of transition metals with known complexing agents. Examples of such metals and metal cations are Ti, Zr, V, Cr, Mo, W, Mn, Fe, Co, Ni, Cu, Zn, Ag, Au, Cd, Hg, Rh, Os, Ir and Pt, and cations thereof. Known complexing agents are ethylenediaminetetraacetic acid and salts thereof, nitrilotriacetic acid and salts thereof, organic amines, cyanide, ammonia and further inorganic anions, such as chloride and sulfate.

The radicals
X is preferably a hydrogen atom, alkyl radicals with 1 to 8 carbon atoms or phenyl radicals;
Y and Z are preferably hydrogen atoms, alkyl radicals with 1 to 8 carbon atoms, phenyl radicals or radicals of the formula—COOR where R is an alkyl radical with 1 to 8 carbon atoms or a phenyl radical; and
M are preferably hydrogen atoms, an alkyl radical with 1 to 10 carbon atoms, phenyl radicals, Lewis acids and inorganic salts of transition metals.
In particular,
X is a hydrogen atom, an alkyl radical having 1 to 4 carbon atoms or phenyl radicals;

Y and Z are hydrogen atoms, an alkyl radical having 1 to 4 carbon atoms or radicals of the formula—COOR wherein R is an alkyl radical of 1 to 4 carbon atoms; and M is a hydrogen atom, an alkyl radical having 1 to 14 carbon atoms, phenyl radicals, Lewis acids and inorganic salts of Ti, V, Cr, Mn, Fe, Co, Ni, Cu and/or Zn.

If n, in the above formula (II), has the value 1, the polymer contains a counterion in order to maintain its electrical neutrality. These counterions are anions, for example inorganic anions, such as fluoride, chloride, bromide, iodide, sulfate, hydrogen sulfate, phosphate, hydrogen phosphate, dihydrogen phosphate, nitrate, perchlorate and tetrafluoroborate, organic anions, such as acetate, trifluoroacetate, trichloroacetate, fluoromethanesulfonate, p-toluenesulfonate and trifluoromethanesulfonate, and other similar anions.

The polymers according to the invention, in particular those which contain units of the formula (I), are obtainable through polycondensation of molecules of the formula (III)

in which X, Y and Z are defined as for the formulae (I) and (II), the radical of the formula—CXE is in the 2-, 3-, 4- or 5-position on the pyrrole ring, W denotes a hydrogen atom, an alkyl radical of 1 to 18 carbon atoms or a phenyl radical; and E denotes identical or different univalent radicals, namely, halogen atoms, in particular chlorine or bromine atoms, alkoxy radicals having 1 to 6 carbon atoms, alkylsulfonate radicals having 1 to 8 carbon atoms or arylsulfonate radicals, or both E radicals represent the oxygen atom of a carbonyl group.

Examples of $C_1$ - to $C_{18}$-alkyl W radicals are the radicals mentioned as examples for $C_1$- to $C_{18}$-alkyl X, Y and Z radicals.

The polycondensation is preferably carried out in the presence of a condensing agent, for example from the group comprising the acid chlorides, acid anhydrides and strong acids and hygroscopic compounds. Examples of hygroscopic compounds are $CaCl_2$, KOH, $CuSO_4$, $Co(NO_3)_2$ and the like; in each case in dried form without water of crystallization. Examples of such acid chlorides are $SOCl_2$, $POCl_3$, $PCl_5$ and p-toluenesulfonyl chloride; examples of such acid anhydrides are acetic anhydride, trifluoromethanesulfonic anhydride, $P_4O_{10}$, $SO_3$ and trifluoroacetic anhydride. Examples of such strong acids are p-toluenesulfonic acid, sulfuric acid, $C_1$ to $C_8$-alkyl- or arylsulfonic acids, fluorosulfonic acid and chlorosulfonic acid. The condensing agent is preferably removed after the condensation, in particular by distillation.

The polycondensation of molecules of the formula (III) can be carried out in the absence of any solvents or can be carried out in the presence of an inert solvent. Examples of such inert solvents are dichloromethane, trichloromethane, tetrachloromethane, tetrachloroethylene, 1,2-dichloroethane, carbon disulfide, nitrobenzene, diethyl ether and other similar solvents. If no solvent is used, a condensing agent, if used, is preferably applied in gaseous form to the compound of the formula (III) to be condensed.

If a polymer is to be formed which contains units of the formula (II), where n has the value of 1, the reaction can proceed from a compound of the formula (III) in which W denotes a hydrogen atom, and the polymer correspondingly formed is subsequently treated as outlined below.

This subsequent treatment is not necessary if the W radical in the formula (III) corresponds to the $M_n$ radical in the formula (II); if, for example, polymers of the formula (I) are to be prepared where n=1 and M=hydrogen, $C_1$ to $C_{18}$-alkyl or phenyl, the reaction proceeds directly from compounds of the formula (III) in which the W radical corresponds to the M radical desired.

The subsequent treatment takes place through removal of residues of the condensing agent and its reaction products, if a condensing agent is used, and quaternizing the nitrogen atom of the heterocyclic ring. Residues of the condensing agent and its reaction products which are still present after the foregoing distillation can be removed by treating the polymer with a polar solvent and, in particular, with a base. The preferred polar solvent is water. Even relatively weak bases, such as ammonia, primary, secondary and tertiary organic amines, carbonate and the like considerably assist the washing-out of condensing agents and their reaction products, which can be checked by elemental analyses of the polymers before and after treatment. The nitrogen atom is subsequently quaternized in order to introduce the M radical according to the formula (II); this is carried out by reacting the polymer with Brönstedt or Lewis acids, metals, metal ions, metal complexes and/or $C_1$ to $C_{18}$-alkylating agents and/or phenylating agents. Examples of Brönstedt acids are HCl, $H_2SO_4$, $HClO_4$, $ClSO_3H$, HBr, $H_2F_2$, HI, $H_3PO_4$, $HNO_3$, $F_3CCOOH$ and other similar compounds, their acid salts, their acid condensates, such as pyrophosphoric acid, tetrafluoroboric acid, trichloroacetic acid, p-toluenesulfonic acid, trifluoromethanesulfonic acid, etc. Examples of Lewis acids, metals, metal ions and metal complexes are the atoms, ions and molecules mentioned above as examples of M. Examples of alkylating agents are methyl iodide, dimethyl sulfate, methyl trifluoromethanesulfonate, diethyl sulfate and the other iodides, bromides, chlorides and sulfates of the $C_1$- to $C_{18}$-alkyl radicals listed above as examples of X, Y and Z.

All reaction participants and auxiliary chemicals listed above can be employed individually or in mixtures. For example, mixtures of compounds of the formula (III), mixtures of condensing agents, of solvents, and of agents for quaternization of the nitrogen atoms in the heterocyclic ring (called "quaternizing agents" below) can be employed.

The condensation of compounds of the formula (III) can be carried out at pressures well above or well below 0.1 MPa (abs.). Pressures from 0.09 MPa (abs.) to 0.11 MPa (abs.), are preferred, in particular the pressure of the ambient atmosphere, i.e., about 0.101 MPa (abs.).

The condensing agent to the compound of the formula (III) molar ratio is preferably 0 to 100, in particular 0.1 to 50, most preferably 0.2 to 35; in general, 0.5 to 2 moles of condensing agent per mole of compound of the formula (III) are sufficient to accelerate the reaction sufficiently. The condensation is preferably carried out at temperatures from 0 to 250° C., in particular, in the presence of strong condensing agents, at temperatures from 15 to 100° C.

After the reaction, the condensing agents, if used, and solvents, if used, are preferably removed by distillation; in particular, the polymer, if obtained as a powder, is separated before distillation from the major part of the solvents and/or condensing agents by filtration. The distillation is preferably carried out at reduced pressure, in particular at pressures less than 1 hPa, specifically at pressures less than 1 Pa (abs.), temperatures up to 150° C. generally being adequate for the distillation in the latter case.

The amount of quaternizing agent, if used, depends on the proportion of nitrogen atoms which are contained in the polymer and bound in the heterocyclic ring to be quaternized.

If desired, the above-mentioned polymers can additionally be doped electrochemically and/or by dopants. Depending on the choice of dopants, the conductivities of the polymers according to the invention can be varied within broad limits. Examples of dopants are alkali metals, such as sodium or potassium; protonic acids, such as $H_2SO_4$, $HClO_4$, $H_2Cr_2O_7$, HI and $HNO_3$; Lewis acids, such as $SbCl_5$, $AsCl_5$, $TiCl_4$, $FeCl_3$, $SnCl_4$, $ZnCl_2$ and $AsF_5$, and halogen, such as, for example, iodine. Treatment of the polymers, according to the invention, with dopant(s) is generally carried out by allowing the vapors or solutions of the dopant to act on the polymers. Treatment is usually carried out at about 10° C. to 30° C., usually while excluding moisture, often while excluding air. The doped polymers preferably contain 0 to 50, most preferably 0.01 to 30, in particular 0.1 to 20, % by weight of dopant.

The polymers according to the invention are black and are generally solids which are insoluble in customary solvents. When the reaction is carried out in a solvent, they are produced as powders. By applying a compound of the formula (III) and, if appropriate, a condensing agent, preferably in the absence of solvents, onto surfaces, films and coatings can be produced.

Depending on the type and extent of their doping and quaternization, the polymers according to the invention are electroconducting or semiconducting compounds. They can be employed, for example, in batteries, circuits and switches, if appropriately mixed with other polymers.

As a consequence of their complexing properties (see Example No. 27 below), the polymers according to the invention can also be used as absorbents for heavy metals and as catalysts.

The present invention will now be described by reference to several examples. It should, however, be recognized that the following examples are merely illustrative of the present invention and are not intended as a definition of the limits and scope thereof.

EXAMPLE 1

5 g of pyrrole-2-carboxaldehyde were introduced in portions into 50 ml of thionyl chloride with stirring. The mixture was then refluxed for 2 hours and allowed to stand at room temperature for 18 hours. The excess thionyl chloride was subsequently removed by distillation at a pressure of about 2 kPa (abs.). The black, shiny, brittle residue was treated for 4 hours at 250° C. and 0.5 Pa (abs.), then ground in a laboratory mill under a protective gas and subsequently treated again for 4 hours at 250° C. and 0.5 Pa (abs.).

Yield and analytical data for the product can be seen in Tables 1 and 2.

EXAMPLES 2 to 11 and 17

The amounts mentioned in Table 1 of compounds of the formula (III) were in each case dissolved in 50 ml of trichloromethane The amounts mentioned in Table 1 of condensing agents, in each case likewise dissolved in 50 ml of trichloromethane, were added dropwise to these refluxing solutions, in each case within half an hour, and the mixtures were refluxed for the reaction time specified. The mixtures were then, in each case, cooled to room temperature, filtered, and the products were washed with anhydrous trichloromethane and dried at 100° C. and 0.5 Pa (abs.). Yields and analytical data can be seen in Tables 1 and 2.

TABLE 1

| | | Reaction of pyrroles of the formula $\begin{array}{c} E \\ -C \\ | \\ X \end{array} E$ | | | | | | | | | |
|---|---|---|---|---|---|---|---|---|---|---|---|
| Example No. | Condensing Agent | Y | Z | X | W | Amount (g) | Reaction Time (h) | Molar Ratio (a) | Yield (g) | (%) (b) | |
| 1 | $SOCl_2$ | H | H | 2-CHO | H | 5 | 2 | 13 | 6.7 | 92 | |
| 2 | $SOCl_2$ | H | H | 2-CHO | H | 10 | 3 | 1 | 9.8 | 91 | |
| 3 | Tosyl chloride | H | H | 2-CHO | H | 10 | 25 | 1 | 8.8 | 58 | |
| 4 | Toluenesulfonic acid | H | H | 2-CHO | H | 10 | 14 | catal. (1 g) | 5.0 | 39 | |
| 5 | $POCl_3$ | H | H | 2-CHO | H | 10 | 9 | 0.3 | 11.7 | 77 | |
| 6 | $POCl_3$ | H | H | 2-CHO | H | 10 | 13 | 1 | 15.1 | 97 | |
| 7 | $(CF_3SO_2)_2O$ | H | H | 2-CHO | H | 5 | 5 | 1 | 9.0 | 86 | |
| 8 | $SOCl_2$ | H | H | $2\text{-}COCH_3$ | H | 5 | 3.5 | 1 | 1.95 | 26 | |
| 9 | $POCl_3$ | H | H | $2\text{-}COCH_3$ | H | 5 | 11.5 | 0.33 | 3.55 | 47 | |
| 10 | $POCl_3$ | H | H | $2\text{-}COCH_3$ | H | 10 | 16 | 1 | 19.4 | 93 | |
| 11 | $POCl_3$ | $2\text{-}CH_3$ | $4\text{-}CH_3$ | $3\text{-}COCH_3$ | H | 5 | 6 | 1 | 7.53 | 92 | |
| 12 | $POCl_3$ | H | H | $2\text{-}COC_6H_5$ | H | 10 | 23 | 1 | 7.46 | 42 | |
| | | | | | | | | | 6.9 | 43 | sol part |
| 13 | $POCl_3$ | H | H | $3\text{-}COC_6H_5$ | H | 1.74 | 17.5 | 26.8 | 2.8 | 100 | |
| 14 | $(CF_3SO_2)_2O$ | H | H | $2\text{-}COC_6H_5$ | H | 5 | 18 | 1 | 4.5 | 78 | |
| 15 | $POCl_3$ | $2\text{-}CH_3$ | $3\text{-}COOC_2H_5$ | 5-CHO | H | 10 | 2.5 | 9.8 | 12.84 | 98 | |
| 16 | $POCl_3$ | H | H | 2-CHO | $CH_3$ | 8.0 | 3 | 1 | 14.2 | | |
| 17 | $POCl_3$ | H | H | 2-CHO | $n\text{-}C_4H_9$ | 8.0 | 34 | 1 | 10.0 | 94 | |
| 18 | $POCl_3$ | H | H | 2-CHO | $n\text{-}C_{10}H_{21}$ | 8.95 | 13.5 | 1 | 9.8 | 97 | |
| 19 | $POCl_3$ | H | H | 2-CHO | $C_6H_5$ | 8.0 | 7 | 1 | 10.0 | 100 | |

(a) Condensing agent: compound of the formula (III) molar ratio
(b) Yield determined via the nitrogen content

TABLE 2

Elemental analyses of the novel polymers

| Example No. | C | H | Cl | N | O | S | P | F |
|---|---|---|---|---|---|---|---|---|
| 1 | 39.97 | 0.91 | 32.59 | 9.19 | 8.92 | 8.40 | — | — |
| 2 | 55.70 | 4.17 | 10.72 | 13.00 | 14.45 | 1.94 | — | — |
| 3 | 59.27 | 4.66 | 0.95 | 9.22 | 18.26 | 7.61 | — | — |
| 4 | 59.26 | 4.65 | — | 11.15 | 19.10 | 5.81 | — | — |
| 5 | 42.77 | 3.58 | 13.55 | 9.64 | 21.98 | — | 8.45 | — |
| 6 | 39.71 | 3.22 | 12.71 | 9.29 | 24.38 | — | 10.66 | — |
| 7 | 34.2 | 2.5 | — | 7.0 | 26.15 | 10.85 | — | 19.3 |
| 8 | 42.61 | 2.44 | 21.60 | 8.40 | 7.42 | 17.49 | — | — |
| 9 | 43.87 | 4.59 | 9.79 | 8.67 | 22.95 | — | 10.10 | — |
| 10 | 35.40 | 3.81 | 18.21 | 6.59 | 24.90 | — | 11.05 | — |
| 11 | 44.89 | 5.11 | 16.80 | 6.30 | — | — | 9.52 | — |
| 17 | 52.5 | 6.1 | 5.60 | 7.0 | 17.5 | — | 11.3 | — |

EXAMPLE 12

10 g (58.4 mmol) of 2-benzoylpyrrole were dissolved in 50 ml of anhydrous chloroform, and 5.36 ml (58.4 mmol) of phosphorus oxychloride in 50 ml of chloroform were added dropwise thereto within 30 minutes while refluxing. After boiling for 2 ½ hours, 1 ml of trifluoromethanesulfonic acid was added, and the mixture was then refluxed again for 20 hours. The precipitated solid was filtered off under suction, washed with 50 ml of anhydrous chloroform, dried for 2 hours in air, and then dried to completion for 2 hours at 19 hPa and 100° C. and then for a further 2 hours at 0.5 Pa and 100° C.

Yield from fraction 1: 7.45 g=42% of the theoretical yield (calculated from the nitrogen content), black insoluble powder. Analysis: C: 47.20%; H: 3.60%; Cl: 8.81%; N: 4.60%; P: 12.85%.

From the suction-filtered chloroform solution, which had been combined with the washings, a further 6.9 g of a black solid were isolated after evaporation at 19 hPa and drying for 2 hours at 0.5 Pa and 100° C.

Yield=43% of the theoretical yield, calculated on the nitrogen content.

Analysis: C: 41.3%; H: 3.8%; Cl: 10.2%; N: 5.1%; P: 7.2%.

EXAMPLE 13

1.74 g of 3-benzoylpyrrole (10.16 mmol), dissolved in 25 ml of anhydrous chloroform, are added dropwise to 25 ml of refluxing phosphorus oxychloride within 15 minutes. The mixture was refluxed for 17.5 hours (bottom temperature 78° C). After evaporating off the solvent and the excess phosphorus oxychloride at reduced pressure at 100° C., the black residue was dried for 9 hours at 0.5 Pa and a further 4 hours at 2 mPa.

Yield=2.8 g=99% of the theoretical yield calculated on the nitrogen content.

Analysis: C: 41.1%; H: 3.0%; Cl: 18.6%; N: 5.1%; O: 12.4%; P: 11.8%.

EXAMPLE 14

5 g of 2-benzoylpyrrole (29.2 mmol) were dissolved in 25 ml of anhydrous chloroform, and 8.24 g (29.2 mmol) of trifluoromethanesulfonic anhydride in 25 ml of chloroform were added dropwise while refluxing. After refluxing for 10 hours, the chloroform was removed by distillation at 2 kPa (abs.). The viscous material remaining was dissolved in 200 ml of methanol, and the product was then precipitated using 750 ml of water. The precipitate was filtered off under suction, washed with water until neutral and dried for 40 hours in a desiccator over $CaCl_2$. The black-brown residue was then dried for 10 hours at 2 mPa, about 100 mg of unreacted 2-benzoylpyrrole subliming off.

Yield: 4.5 g=78% of the theoretical yield, calculated on the nitrogen content.

Analysis: C: 63.0%; H: 4.3%; N: 7.1%; O: 13.2%; F: 7.1%; S: 4.9%.

EXAMPLE 15

10 g of 2-methyl-3-carboxyethyl-5-formylpyrrole (55.2 mmol), dissolved in 100 ml of anhydrous chloroform, were added dropwise while stirring to 50 ml of $POCl_3$, preheated to 90° C. on a waterbath, and the mixture was then refluxed for 1.5 hours. After standing overnight, the majority of the solvent was removed by distillation until the bottom temperature had reached 90° C. The mixture was then stirred for an additional hour at this temperature, and the excess $POCl_3$ was then removed by distillation in a water-pump vacuum. The black solid residue was purified by heating for 8 hours at 100° C. and $5 \times 10^{-3}$ mbar.

Yield: 12.84 g=98% of the theoretical yield, calculated on the nitrogen content.

Analysis: C: 41.3%; H: 4.2%; Cl: 7.2%; N: 5.9%; O: 32.4%; P: 6.5%.

EXAMPLE 16

8.0 g (73.3 mmol) of N-methylpyrrole-2-carboxaldehyde were dissolved in 50 ml of anhydrous chloroform, and 11.2 g (73.3 mmol) of phosphorus oxychloride in 50 ml of chloroform were then added dropwise within 50 minutes while refluxing. The mixture was refluxed for 3 hours, subsequently cooled to room temperature and allowed to stand overnight. The precipitated solid was filtered off under suction under argon via a Schlenk frit and washed with 150 ml of chloroform, and dried for 2 hours at 0.5 Pa and then for 4 hours at 2 mPa and 100° C. The product was ground under nitrogen.

Yield: 12.24 g of black, insoluble polymer.

Analysis: C: 43.83%; H: 3.57%; Cl: 18.1%; N: 8.17%; O: 15.03%; P: 13.1%.

EXAMPLE 18

8.95 g (38 mmol) of N-decylpyrrole-2-carboxaldehyde were dissolved in 50 ml of anhydrous chloroform, and 5.83 g (38 mmol) of phosphorus oxychloride in 50 ml of chloroform were then added dropwise within 30 minutes while refluxing. The mixture was refluxed for 13.5 hours, subsequently cooled to room temperature and allowed to stand overnight. The solvent was then evaporated off in vacuo, and the residue was dried to completion for 4 hours at 0.5 Pa and, after grinding under nitrogen, for a further 4 hours at 2 mPa and 100° C.

Yield: 9.8 g=97% of the theoretical yield theory (calculated on the nitrogen content).

Analysis: C: 66.80%; H: 7.95%; Cl: 3.8%; N: 5.25%; O: 8.4%; P: 7.8%.

EXAMPLE 19

8.0 g (46.7 mmol) of N-phenylpyrrole-2-carboxaldehyde were dissolved in 50 ml of anhydrous chloroform, and 7.2 g (46.7 mmol) of phosphorus oxychloride in 50 ml of chloroform were added dropwise thereto within 60 minutes while refluxing. The mixture was refluxed for 7 hours, subsequently cooled to room temperature and allowed to stand overnight. The solvent was stripped off at 1 hPa, and the residue was dried for 3 hours in a waterbath at 100° C. After grinding under nitrogen, the product was dried for 4 hours at 100° C. and 2 mPa.

Yield: 10.0 g=100% of the theoretical yield (calculated on the nitrogen content) of a black, insoluble polymer.

Analysis: C: 57.56%; H: 4.2%; Cl: 3.54%; N: 6.5%; O: 18.0%; P: 10.1%.

EXAMPLE 20

Production of a graphite coating 500 mg of 2-pyrrolecarboxaldehyde were melted and uniformly distributed on a circular graphite disk of diameter 7.6 cm. The disk was then transferred onto a perforated porcelain plate, prewarmed to 80° C., in a desiccator, in which a petri dish containing 20 ml of $POCl_3$ had been placed under the porcelain insert. After 1 hour, a black, greenish-iridescent coating, which did not change after heating for 18 hours at 100° C., had formed on the graphite disk.

EXAMPLE 21

A solution of 22 mg of 2-pyrrolaldehyde in ether was poured onto a polished silicon disk of diameter 7.6 cm which had been heated to 60° C. After the ether had evaporated, the disk was exposed to $POCl_3$ vapors analogously to Example 20. It was then stored overnight in a petri dish under 50 ml of chloroform, the film separating from the silicon layer. The detached film was dried for two days in air between filter papers. A black-greenish iridescent, smooth film was obtained. The conductivity, measured by the two-point method, was $2 \times 10^{-4}$ S/cm.

EXAMPLE 22

Analogously to Example 20, 22 mg of 2-acetylpyrrole were melted at 100° C. on a silicon disk, which was then exposed to $POCl_3$ vapors in a desiccator which had been prewarmed to 100° C. in a drying cabinet. After 1 hour, a glossy black film had formed on the silicon disk.

EXAMPLE 23

5 ml of fuming sulfuric acid (65% of $SO_3$) were introduced into a petri dish of diameter 9 cm and height 2 cm with a flat-ground upper rim. Two glass rods of diameter 1 cm were placed in the petri dish as spacers, and a silicon disk, which had been coated analogously to Example 21 with 46 mg of 2-pyrrolecarboxaldehyde in 1 ml of ether, was placed thereon. The petri dish was allowed to stand, covered, for 12 hours at room temperature, a black coating forming. The silicon disk was then placed for 2×4 hours in 25 ml of chloroform in each case, and dried. A black, greenish-iridescent coating, which could easily be detached from the surface, was obtained.

EXAMPLE 24

Extraction with water in order to remove the condensing agent and its reaction products 4 g of the powder produced according to Example 6 were washed 3 times by stirring with 70 ml of water in each case, and again filtered off under suction. The filtration residue was then dried for 2 hours at 100° C. and 0.5 Pa.

Yield: 2.98 g.

Analysis: C: 47.7%; H: 4.1%; Cl: 0.5%; N: 11.3%; O: 27.6%; P: 9.5%.

EXAMPLE 25

Extraction with aqueous $NH_3$ in order to remove the condensing agent and its reaction products.

5 g of the powder produced according to Example 6 were washed three times at room temperature by stirring with 25 ml of 10% strength aqueous ammonia in each case for one hour in each case, and filtered off under suction. After the final filtration under suction, the solid was washed with water until neutral. After drying for 4 hours at 100° C. and 0.5 Pa, the filtration residue gave 3.0 g of a black powder.

Analysis: C: 60.12%; H: 4.64%; N: 16.88%; O: 16.0%; P: 1.97%; Cl: 0.3%.

EXAMPLE 26

2 g of the powder produced according to Example 6 were stirred twice for 24 hours in each case with 30 g of potassium iodide in 100 ml of water, filtered off under suction and finally washed with 100 ml of water. The black powder was dried to completion for 2 hours at 100° C. in a water-pump vacuum.

Yield: 1.6 g

Analysis: C: 49.4%; H: 3.6%; I: 23.7%; N: 11.2%; O: 11.4%; P:0.6%.

EXAMPLE 27

2 g of the powder produced according to Example 6 were stirred for 15 minutes with 15 ml of 10% strength aqueous ammonia at room temperature. A solution of 842 mg of copper sulfate ($CuSO_4 \times 5H_2O$) in 10 ml of water was then added, and the mixture was stirred for 3 days at room temperature, and the solid was filtered off under suction, washed with water and dried for 2 hours at 0.5 Pa.

Yield: 1.35 g

Analysis: C: 57.2%; H: 3.6%; N: 15.9%; O: 12.9%; Cu: 10.3%.

EXAMPLE 28

Doping and conductivity measurements on powders

Doping with iodine was carried out in a Schlenk tube in the gas phase, 500 mg of the sample being mixed with 150 mg of iodine, the mixture cooled using liquid nitrogen and evacuated to 0.5 Pa. The Schlenk tube was subsequently stored for at least 4 hours in a drying cabinet at 100° C. until the iodine color in the gas space had disappeared. The conductivity was measured under a pressure of 100 MPa at room temperature by the 4-point method for conductivities (sic)$\leq 10^{-10}$ and by the 2-point method for conductivities $>10^{-10}$. Table 3 shows the conductivities achieved.

TABLE 3

| | Powder Conductivity | |
|---|---|---|
| | Conductivity (S/cm) | |
| Substance from Example No. | undoped | 0.3 g of iodine/g of polymer |
| 1 | $7.4 \times 10^{-7}$ | $6.8 \times 10^{-8}$ |
| 2 | $1.4 \times 10^{-6}$ | $5.1 \times 10^{-6}$ |
| 3 | $1.2 \times 10^{-8}$ | $2.8 \times 10^{-8}$ |
| 4 | $3.9 \times 10^{-9}$ | $1.1 \times 10^{-8}$ |
| 5 | $4.9 \times 10^{-8}$ | — |
| 6 | $4.7 \times 10^{-7}$ | $9.3 \times 10^{-6}$ |
| 13 | $<10^{-12}$ | — |
| 24 | $2.8 \times 10^{-4}$ | — |
| 25 | $1.0 \times 10^{-10}$ | $4.4 \times 10^{-8}$ |
| 26 | $8.6 \times 10^{-9}$ | — |

DESCRIPTION OF THE FIGURES

FIG. 1

CP-MAS-$^{13}$C-NMR (solid phase "magic angle spinning" NMR) of a sample produced according to Example 6.

Figure 1:
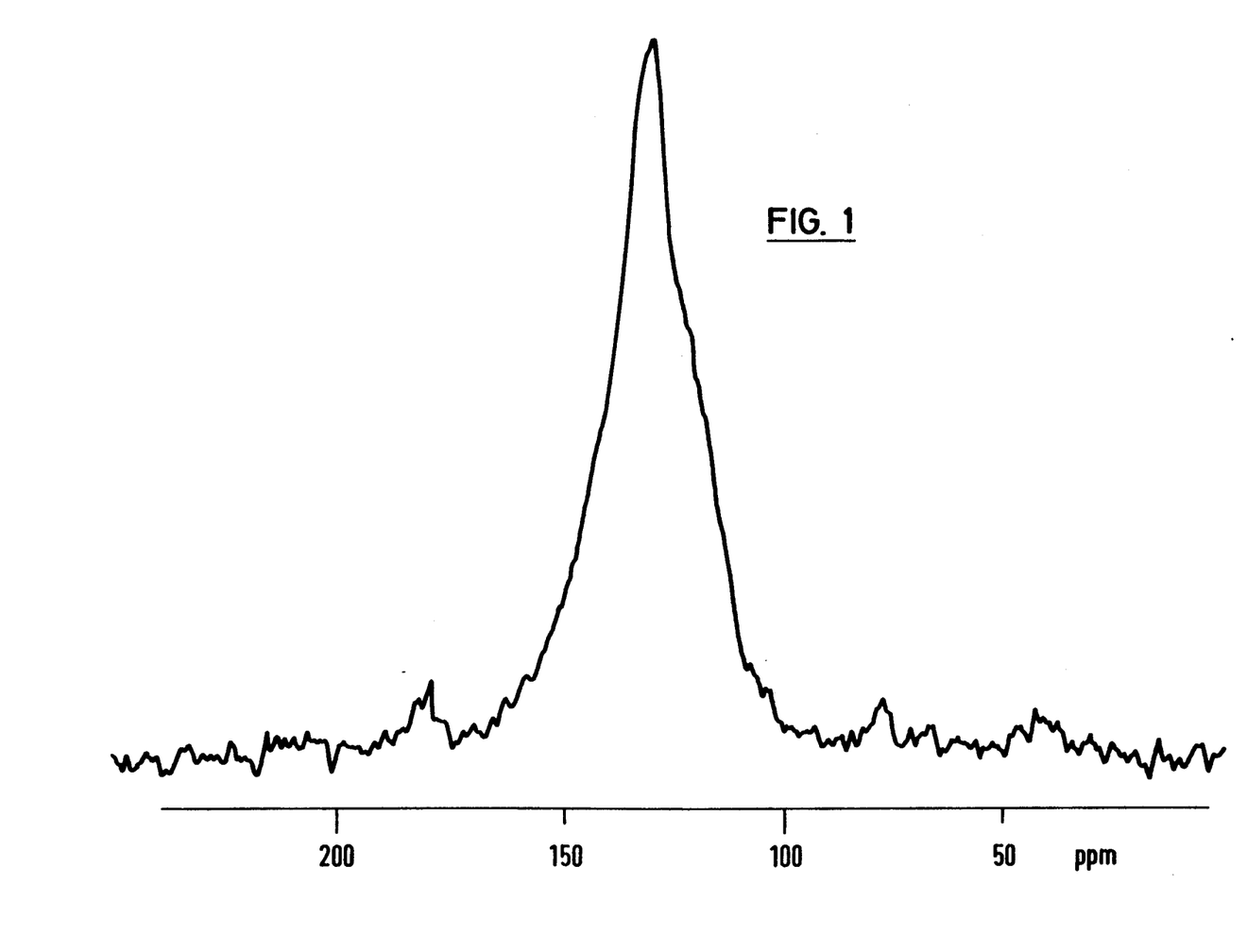

The single signal at about 130 ppm indicates that the carbon atoms in the polymer are virtually exclusively sp$_2$-hybridized.

FIG. 2

CP-MAS-$^{13}$C-NMR of a sample produced according to Example 17.

Figure 2:
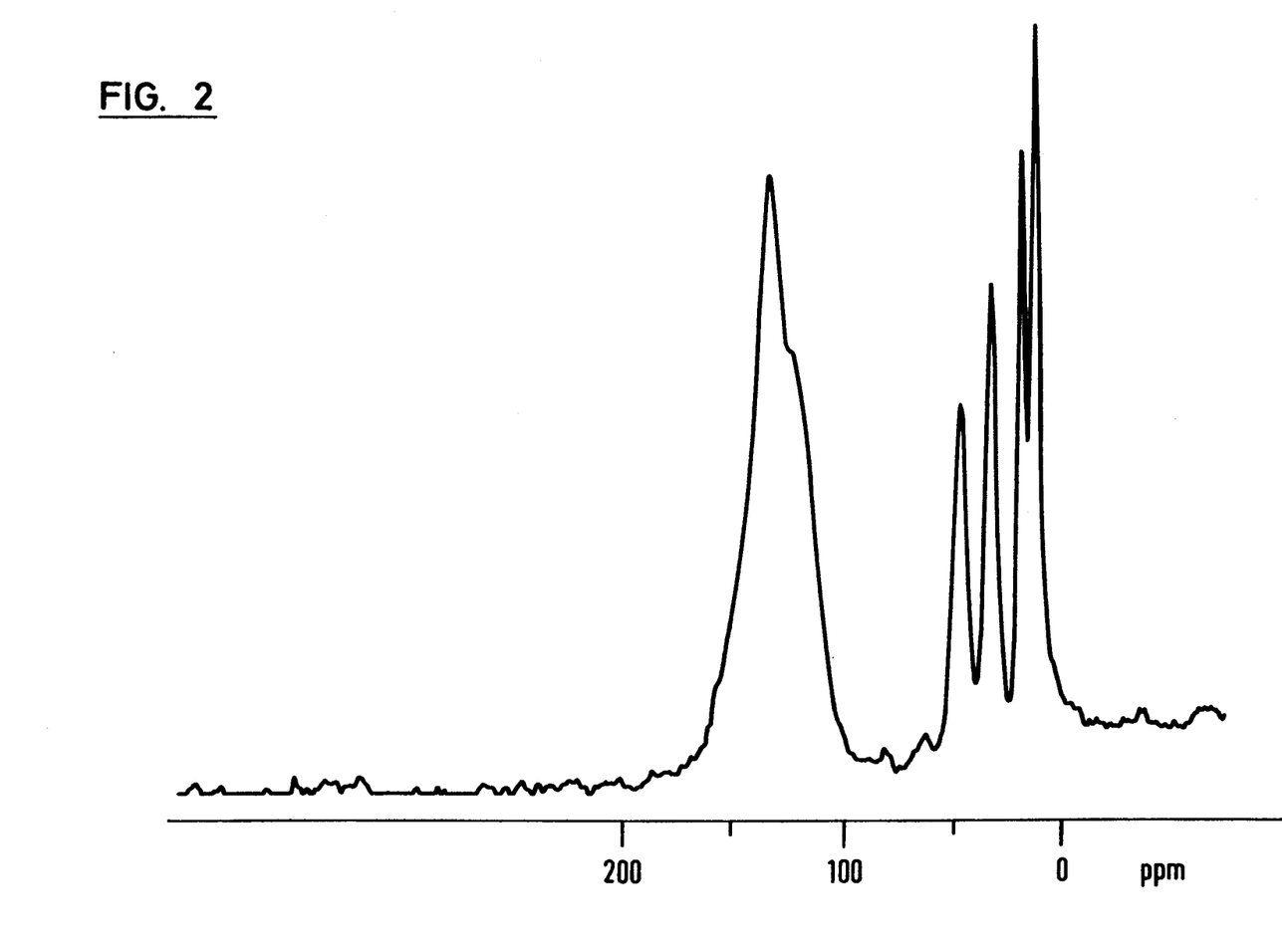

In addition to the signal of the sp$_2$-hybridized carbon atoms, the signals of sp$_3$ carbon atoms of the N-bound n-butyl group also appear.

FIG. 3

CP-MAS-$^{15}$N-NMR of a polymer prepared according to Example 5, but using 15N-labeled pyrrole-2-carboxaldehyde.

Figure 3:
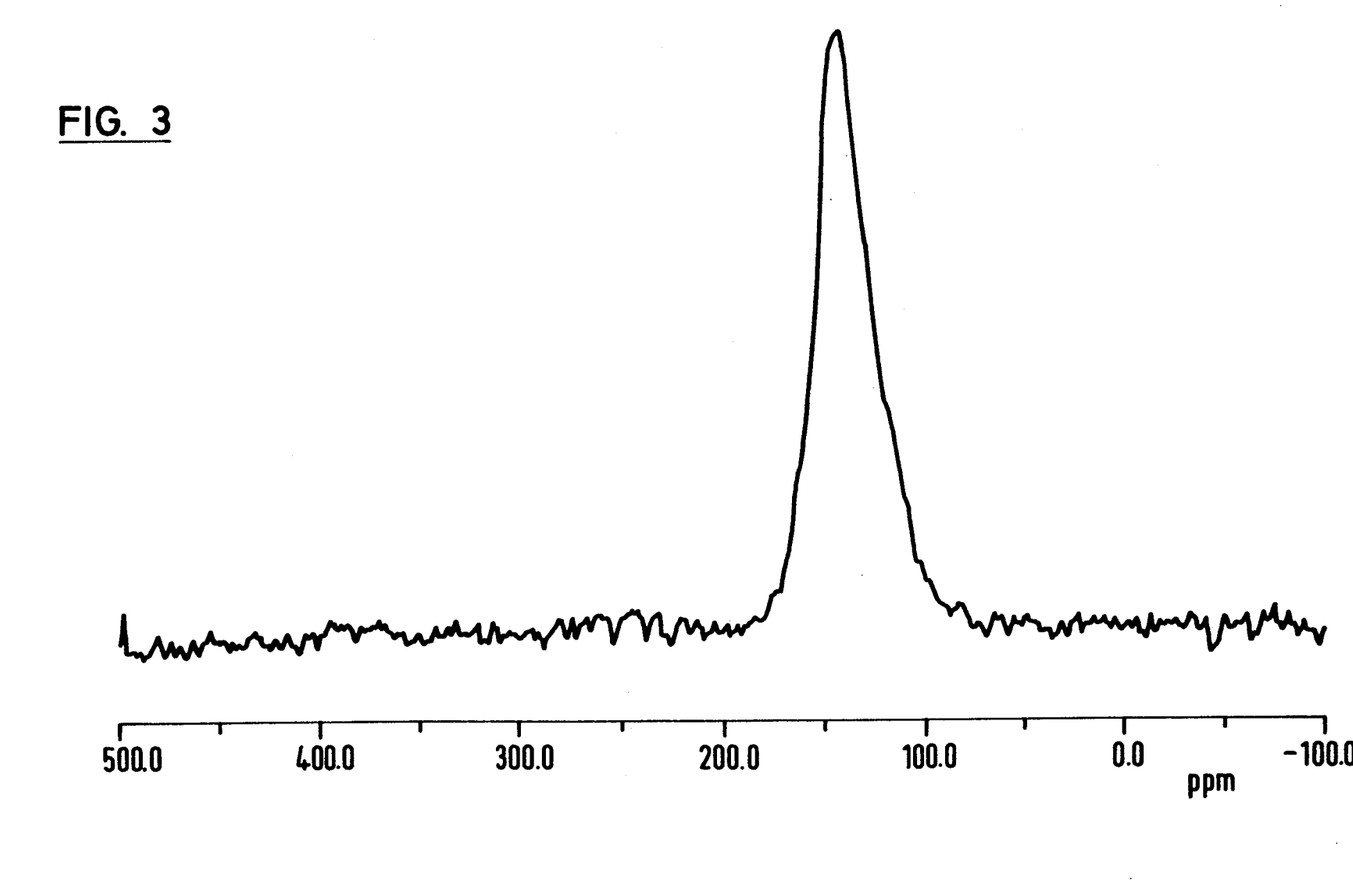

The single signal at about 145 ppm indicates that the nitrogen atoms are virtually completely protonated.

While only several embodiments of the present invention have been shown and described, it will be obvious to those skilled in the art that many modifications may be made to the present invention without departing from the spirit and scope thereof.

What is claimed is:

1. A process for the preparation of a polypyrrylenemethine polymer composition, or a salt thereof, comprising a polymer compound having conjugated double bonds and constructed from at least five five-membered heterocyclic rings wherein in each of said five-membered heterocyclic rings there is one nitrogen atom as the only heterocyclic atom, said five-membered heterocyclic rings being bonded to one another in pairs;

(III)

wherein,

X, Y and Z represent, independently of one another, identical or different monovalent radicals selected from the group consisting of hydrogen, an alkyl radical having from 1 to 18 carbon atoms, a phenyl radical and a phenyl radical which is substituted by a member selected from the group consisting of a halogen, a nitro-group, an alkyl group having 1 to 4 carbon atoms, a phenyl radial and a combination thereof, wherein Y and Z are bonded to the carbon atoms of the heterocyclic ring which are not substituted by groups of the formula C-X, Y and Z are further capable of being a substituent of the formula —COOR, wherein R represents a member selected from the group consisting of a hydrogen atom, a phenyl group and an alkyl group having from 1 to 18 carbon atoms;

and the radical of the formula—CXE$_2$ is in the 2-, 3-, 4- or 5-position on the pyrrole ring.

wherein,

W represents a substituent selected from the group consisting of a hydrogen atom, an alkyl group having from 1 to 18 carbon atoms and a phenyl radical; and E represents the same or different monovalent radicals selected from the group consisting of a halogen atom, an alkoxy radical having 1 to 6 carbon atoms, and alkylsulfonate radical having 1 to 8 carbon atoms and an arylsulfonate radical, or both E radicals represent the oxygen atom of a carbonyl group, via polycondensation.

2. The process according to claim 1, wherein E of formula (III) is a halogen atom selected from the group consisting of chlorine and bromine.

3. The process according to claim 1, wherein said reacting step via polycondensation is carried out in the presence of a condensing agent.

4. The process according to claim 3, wherein said condensing agent is a member selected from the group consisting of an acid chloride, an acid anhydride and a combination thereof.

5. The process according to claim 4, wherein said acid chloride is a member selected from the group consisting of SOCl$_2$, POCl$_3$, PCl$_5$, p-toluenesulfonyl chloride and a combination thereof.

6. The process according to claim 4, wherein said acid anhydride is a member selected from the group consisting of acetic anhydride, trifluoromethanesulfonic anhydride, P$_4$O$_{10}$, SO$_3$, trifluoroacetic anhydride and a combination thereof.

7. The process according to claim 3, wherein said condensing agent is a strong acid selected from the group consisting of p-toluenesulfonic acid, sulfuric acid, C$_1$- to C$_8$-alkylsulfonic acid, arylsulfonic acid, fluorosulfonic acid, chlorosulfonic acid and a combination thereof.

8. The process according to claim 3, wherein said condensing agent is a hygroscopic compound selected from the group consisting of CaCl$_2$, KOH, CuSO$_4$, Co(NO$_3$)$_2$ and a combination thereof, said hygroscopic compound being in a dried form and free of any water of crystallization.

9. The process according to claim 3, wherein said condensing agent is removed after the polycondensation.

10. The process according to claim 9, wherein said condensing agent is removed via distillation.

11. The process according to claim 9, wherein polymer composition is to contain units of the formula (II)

(II)

wherein,

X, Y and Z represent, independently of one another, identical or different monovalent radicals selected from the group consisting of hydrogen, an alkyl radical having from 1 to 18 carbon atoms, a phenyl radical and a phenyl radical which is substituted by a member selected from the group consisting of a halogen, a nitro-group, an alkyl group having 1 to 4 carbon atoms, a phenyl radial and a combination thereof, wherein Y and Z are bonded to the carbon atoms of the heterocyclic ring which are not substituted by formula C-X, Y and Z are further capable of being a substituent of the formula —COOR, wherein R represents a member selected from the group consisting of a hydrogen atom, a phenyl group and an alkyl group having from 1 to 18 carbon atoms;

M represents a member selected from the group consisting of hydrogen, a metal atom, a metal complex, a Lewis acid, an alkyl group having from 1 to 18 carbon atoms and a phenyl radical; and n represents the number 1, and the appropriate unit of formula (I) has a positive charge, and the dashed circle within the five-membered ring in the formula (II) represents two bonding $\pi$-electron pairs in the heterocyclic ring, wherein the formula (I) is wherein, A represents substituents, independently selected from one another, which are identical or different, of the formula (II), and wherein the M substituent desired, as defined in formula (II), has not already been introduced by said condensing agent employed, residue of said condensing agent not otherwise removed via the distillation is removed via a treatment step with a polar solvent with the nitrogen atom being subsequently quanternized in order to introduce the M substituent, according to the formula (II), said quaternization step being carried out by reacting said polymer composition obtained with a member selected from the group consisting of a Brönstedt acid, a Lewis acid, a metal, a metal ion, a metal complex, an alkylating agent having 1 to 18 carbon atoms, a phenylating agent and a combination thereof.

12. The process according to claim 11, wherein said polar solvent is a member selected from the group consisting of water, ammonia, a primary amine, a secondary amine, a tertiary amine, a carbonate and a combination thereof.

13. The process according to claim 11, wherein said Brönstedt acid is a member selected from the group consisting of HCl, $H_2SO_4$, $HClO_4$, $ClSO_{33}H$, HBr, $H_2F_2$, HI, $H_3PO_4$, $HNO_3$, $F_3CCOOH$, an acid salt of HCl, an acid salt of $H_2SO_4$, an acid salt of $HClO_4$, an acid salt of $ClSO_3H$, an acid salt of HBr, an acid salt of $H_2F_2$, an acid salt of HI, an acid salt of $H_3PO_4$, an acid salt of $HNO_3$, an acid salt of $F_3CCOOH$, an acid condensate of HCl, an acid condensate of $H_2SO_4$, an acid condensate of $HClO_4$, an acid condensate of $ClSO_3H$, an acid condensate of HBr, an acid condensate of $H_2F_2$, an acid condensate of HI, an acid condensate of $H_3PO_4$, an acid condensate of $HNO_3$, an acid condensate of $F_3CCOOH$, and a combination thereof.

14. The process according to claim 13, wherein said member is pyrophosphoric acid, tetrafluoroboric acid, trichloroacetic acid, p-toluenesulfonic acid, trifluoromethanesulfonic acid and a combination thereof.

15. The process according to claim 11, wherein said Lewis acid, said metal, said metal ion and said metal complex are of the atoms selected from the group consisting of Ti, V, Cr, Mn, Fe, Co, Ni, Cu, Zn and a combination thereof.

16. The process according to claim 11, wherein said alkylating agent is a member selected from the group consisting of methyl iodide, dimethyl sulfate, methyl trifluoromethanesulfonate, diethyl sulfate, an iodide of an alkyl group having 1 to 18 carbon atoms, a bromide of an alkyl group having 1 to 18 carbon atoms, a chloride of an alkyl group having 1 to 18 carbon atoms, a sulfide of an alkyl group having 1 to 18 carbon atoms, and a combination thereof.

17. The process according to claim 1, wherein said polycondensation is carried out without a solvent and a condensing agent is applied in a gaseous form to the compound of the formula (III) which is to undergo condensation.

18. The process according to claim 1, wherein said polycondensation is carried out in the presence of an inert solvent selected from the group consisting of dichloromethane, trichloromethane, tetrachloromethane, tetrachloroethylene, 1,2-dichloroethane, carbon disulfide, nitrobenzene, diethyl ether and a combination thereof.

19. The process according to claim 1, wherein said polypyrrylene-methine polymer composition further comprises up to 50%, relative to the weight of said polymer, a dopant.

20. The process according to claim 1, wherein said polypyrrylene-methine polymer composition is doped electrochemically.

* * * * *